US007860002B2

(12) United States Patent
Lee et al.

(10) Patent No.: US 7,860,002 B2
(45) Date of Patent: Dec. 28, 2010

(54) PRIORITY-BASED ADMISSION CONTROL IN A NETWORK WITH VARIABLE CHANNEL DATA RATES

(75) Inventors: Whay Chiou Lee, Cambridge, MA (US); John R. Barr, Deer Park, IL (US); Stephen P. Emeott, Rolling Meadows, IL (US); Ravishankar Ramamirtham, Shrewsbury, MA (US); S. David Silk, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 96 days.

(21) Appl. No.: 12/173,804

(22) Filed: Jul. 15, 2008

(65) Prior Publication Data

US 2010/0014422 A1      Jan. 21, 2010

(51) Int. Cl.
*H04L 1/00* (2006.01)
(52) U.S. Cl. .................... 370/230; 370/230.1; 370/231
(58) Field of Classification Search ............... 370/230, 370/232, 235, 229, 230.1, 231, 233, 234
See application file for complete search history.

(56) References Cited

U.S. PATENT DOCUMENTS

| 6,810,428 | B1 | 10/2004 | Larsen et al. | |
|---|---|---|---|---|
| 6,922,564 | B2 * | 7/2005 | Witana | 455/452.2 |
| 6,982,987 | B2 | 1/2006 | Cain | |
| 6,999,419 | B2 * | 2/2006 | Ise et al. | 370/230 |
| 7,161,907 | B2 * | 1/2007 | Mott | 370/232 |
| 7,587,203 | B2 * | 9/2009 | Shahidi et al. | 455/423 |
| 2002/0097674 | A1 * | 7/2002 | Balabhadrapatruni et al. | 370/229 |
| 2003/0133411 | A1 * | 7/2003 | Ise et al. | 370/230 |

(Continued)

FOREIGN PATENT DOCUMENTS

EP      1538790      6/2005

OTHER PUBLICATIONS

Pong, D. et al., "Fairness and Capacity Trade-off in IEEE 802.11 WLANs," IEEE LCN, 2004, Abstract only.

(Continued)

*Primary Examiner*—Chi H Pham
*Assistant Examiner*—Robert Lopata
(74) *Attorney, Agent, or Firm*—Larry T. Cullen (57) ABSTRACT

A method for priority-based admission control in a network, comprises receiving an admission request for transmitting an information flow to a network through a communication channel and determining an admissible region within a range of a channel data rate of a communication channel for an information flow in response to a priority of the information flow, where the priority of the information flow is one of a plurality of priorities of information flow. The admissible region is one of a plurality of admissible regions within the channel data rate range that correspond to different ones of the plurality of priorities of information flow, respectively, and each of the plurality of admissible regions within the channel data rate range is useable for transmitting information flow with a respective one of the plurality of priorities. Further included in the method is determining an available channel data rate of the communication channel for receiving the information flow by the network, and granting the admission request for the information flow after determining that the available channel data rate of the communication channel is within the admissible region of the channel data rate range.

13 Claims, 5 Drawing Sheets

U.S. PATENT DOCUMENTS

| | | | | |
|---|---|---|---|---|
| 2003/0185243 | A1* | 10/2003 | Klotsche | 370/498 |
| 2004/0022190 | A1* | 2/2004 | Davies et al. | 370/230 |
| 2005/0163103 | A1* | 7/2005 | Malomsoky et al. | 370/352 |
| 2006/0045012 | A1* | 3/2006 | Cherukuri et al. | 370/230 |
| 2007/0071024 | A1* | 3/2007 | Schentrup et al. | 370/443 |
| 2007/0147241 | A1* | 6/2007 | Wang et al. | 370/230 |
| 2008/0031202 | A1 | 2/2008 | Benveniste | |
| 2008/0075003 | A1* | 3/2008 | Lee et al. | 370/230 |
| 2010/0103819 | A1* | 4/2010 | Samuels et al. | 370/235 |

OTHER PUBLICATIONS

Gao, D. et al., "Admission Control in IEEE 802.11e Wireless LANs," IEEE Communications Letters, vol. 9, No. 8, Aug. 2005.

Grossglauser, M. et al, "A Framework for Robust Measurement-Based Admission Control," IEEE\ACM Transactions on Networking, 1997.

Gu, D. et al., "A New Measurement-Based Admission Control Method for IEEE 802.11 Wireless Local Area Networks," IEEE International Symposium on Personal, Indoor and Mobile Rad.

Moorman, J.R. et al., "Wireless Call Admission Control Using Threshold Access Sharing," IEEE Globecom 2001, Abstract only.

Park, D. et al., "Wireless Packet Scheduling Based on the Cumulative Distribution Function of User Transmission Rates," IEEE Trans. On Communications, vol. 53, No. 11, Nov.2005.

Bai, A. et al., "A Model-Based Admission Control for 802.11e EDCA using Delay Predictions," IPCCC 2007, Abstract only.

Georgoulas, P. et al., "Admission Control Placement in Differentiated Services Networks," ISCC 2004.

Lee, T.K. et al., "An Efficiency Study of Different Model-Based and Measurement-Based Connection Admission Control Techniques Using Heterogeneous Traffic Sources," 1999, Abst.

Ergen, M. et al., "Throughput Analysis and Admission Control for IEEE 802.11a," Mobile Networks and Applications, 10, pp. 705-716, 2005, Abstract only.

Lee, S. et al., "Adaptive Physical Rate based Admission Control at EDCA in IEEE 802.11e WLANs," Electronics Letters, vol. 43, No. 22, Oct. 25, 2007.

PCT Search Report & Written Opinion, RE: Application #PCT/US09/48425 Aug. 11, 2009.

* cited by examiner

PRIORITY-BASED ADMISSION CONTROL IN A NETWORK WITH VARIABLE CHANNEL DATA RATES

BACKGROUND

In a communication or data network like a home network, through which smart devices, such as computers, televisions, appliances, etc., may be connected through wireless and/or wired communication channels to a computer, a television, etc., an admission request for transmitting an information flow to the network has been selectively granted to keep an overall network load to a level below a maximum capacity of the network. As referred herein, smart devices that are connected to the communication network are communication stations (hereinafter, "stations" for short) that communicate with one another via the communication network.

If all things were equal for stations connected to a network, that is, the station had more or less the same transmission rates, information flows with more or less same priorities, etc., network resources may be fairly distributed among stations by granting an equal time of network access to each station. However, stations connected to a network often have communication channels with different transmission rates and information flows with different priorities. For instance, in a wireless local area network (LAN), a data rate of a communication channel depends on varying channel conditions, such as path loss, shadowing, fading, etc. and on distances between stations and an access point.

Because of varying channel conditions and different distances between stations and an access point, especially in mobile stations, stations connected to a network through communication channels that have varying channel conditions and/or varying distances between the stations and an access point often vary their transmission rates to adapt to the changing transmission conditions.

With respect to stations connected to a network with varying transmission rates as discussed above, one conventional way of determining an admission request by a station for transmitting an information flow to a network has been to favor a granting of a maximization of an overall throughput of information flow in the network by granting admission requests of stations with relatively high transmission rates. However, the throughput maximization approach often discriminates stations with relatively low transmission rates by denying admission requests from those stations, even when information flows from such stations are of relatively high priorities in comparison to the priorities of information flows from stations with relatively high transmission rates.

Another method has been to use a required time fraction to ensure that a sum of the required time fraction for a station's flow and required time fractions associated with other admitted information flows does not exceed a predetermined limit. This method may consider a cumulative distribution function of channel data rate for a communication channel between each station and the network in estimating the required time fraction for a station to achieve a particular throughput and thereafter making an admissions control decision. However, this method does not give a fair consideration to relative priorities of information flow.

Although there have been recent attempts to control admission requests for transmitting an information flow to a network with variable channel data rates and prevent overloading the network, such attempts have proven to be less than successful because the proposed solutions are inefficient in assigning network resources fairly among different stations connected to the network.

SUMMARY OF THE INVENTION

Accordingly, in one example, there is provided a method for priority-based admission control in a network that comprises receiving an admission request for transmitting an information flow to a network through a communication channel and determining an admissible region within a range of a channel data rate of the communication channel in response to a priority of the information flow, where the priority of the information flow is one of a plurality of priorities of information flow. The admissible region is one of a plurality of admissible regions within the channel data rate range that correspond to different ones of the plurality of priorities of information flow, respectively, and each of the plurality of admissible regions within the channel data rate range is useable for transmitting information flow with a respective one of the plurality of priorities. Further included in the method is determining an available channel data rate of the communication channel for receiving the information flow by the network, and granting the admission request for the information flow after determining that the available channel data rate of the communication channel is within the admissible region of the channel data rate range.

In another example, there is provided a system for priority-based admission control in a network. The system comprises an admission controller configured to receive an admission request for transmitting an information flow to a network through a communication channel, determine an admissible region within a range of a channel data rate of the communication channel based on a priority of the information flow among a plurality of priorities of information flow, and grant the admission request for the information flow based on a determination that an available channel data rate of the communication channel for receiving the information flow by the network is within the admissible region of the channel data rate range. The admissible region is one of a plurality of admissible regions within the channel data rate range that correspond to different ones of the plurality of priorities of information flow, respectively, and each of the plurality of admissible regions within the channel data rate range is useable for transmitting information flow with a respective one of the plurality of priorities. The system further includes a policy database configured to communicate to the admission controller information as to a priority of a user associated with the information flow, where the admission controller is configured to use the information to determine the priority of the information flow.

In another example, there is provided a computer program product embodied on one or more computer readable mediums for priority-based admission control. The computer program product comprises instructions to receive an admission request for transmitting an information flow to a network through a communication channel and obtain a priority of the information flow, where the priority of the information flow is one of a plurality of priorities of information flow. The computer program product further includes instructions for determining an admissible region within a range of a channel data rate of the communication channel in response to the priority of the information flow. The admissible region is one of a plurality of admissible regions within the channel data rate range that correspond to different ones of the plurality of priorities of information flow, respectively, and each of the plurality of admissible regions within the channel data rate range is useable for transmitting information flow with a respective one of the plurality of priorities. Also included in the computer product are instructions to determine an available channel data rate of the communication channel and grant the admission request for the information flow after determining that the available channel data rate of the communication channel is within the admissible region of the channel data rate range.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

A priority-based admission control for a network according to an example grants an admission request from a station connected to the network for transmitting an information flow to the network through a communication channel. The admission request may be granted by the priority-based admission control based on a priority of the information flow and an overall load on the network.

In another example, information flows from stations to a network may be classified into a plurality of priorities based on a priority of a user associated with the information flow and/or other quality of service (QoS) requirements. The plurality of priorities of information flow may be determined based on any reasonably-suitable criteria useable for classifying information flow according to priorities.

In determining whether to admit an information flow based on a priority of the information flow, a cumulative distribution function of a channel data rate of a communication channel for transmitting the information flow may be first obtained to determine an admissible region within a range of a channel data rate of the communication channel, which is useable for transmitting the information flow. The cumulative distribution function may be obtained over a reasonably-suitable range of the channel data rate of the communication channel, such as a full or reasonably comprehensive range of the channel data rate of the communication channel.

In general, a cumulative distribution function of a channel data rate of a communication channel represents a density function of probability that an actual channel data rate of the communication channel is less than a channel data rate point on the channel data rate axis. A cumulative distribution function of a channel data rate of the communication channel may be determined by tracking the channel data rate of the communication channel throughout a reasonably-suitable range of the channel data rate of the communication channel, such as a full or reasonably-comprehensive channel data rate range of the communication channel.

As to a frequency of performing the tracking and determining of the channel data rate for determining the cumulative distribution function of the channel data rate on the communication channel, the channel data rate of the communication channel may be tracked and determined once for all admission requests for information flow on the communication channel or be updated, for instance, with each admission request for information flow.

Using the cumulative distribution of the channel data rate of the communication channel, as determined above, different regions of the channel data rate range correspond to different priorities of information flow, respectively. With such assignment of different regions of the channel data rate range to different priorities of information flow, respectively, a probability of an admission to the network for an information flow with a particular priority class is equal to a difference between a maximum point and a minimum point on the cumulative distribution axis of the cumulative distribution function across the region assigned to the priority of the information flow.

In assigning different regions of the channel data rate range based on the cumulative distribution function of the channel data rate of the communication channel, the assignment may be made by any reasonably-suitable way of matching a priority of information flow with an appropriate probability of an admission for information flow with the priority. According to an example, an admissible region within a channel data rate range of a communication channel, which is useable for transmitting an information flow with a relatively higher priority class, may correspond to a higher probability of admission to the network.

According to another example of assigning different regions of the channel data rate range based on the cumulative distribution function of the channel data rate of the communication channel, the channel data rate range is first divided into a plurality of non-overlapping regions. After the division of the channel data rate range into the plurality of non-overlapping regions, the non-overlapping regions may be grouped into different groups, which groups in turn correspond to different priorities of information flow, respectively. In assigning different groups of non-overlapping regions to different priorities of information flow, respectively, a non-overlapping region having the lowest channel data rate and being assignable for transmitting information flow on the communication channel may be dedicated to information flow with the highest priority class.

The above-discussed assignment of different groups of non-overlapping regions of a channel data rate range of a communication channel to different priorities of information flow, respectively, may be designed to give a relatively higher probability of admission for information flow with a relatively higher priority class than for information flow with a relatively lower priority class. For instance, such a design may be accomplished by assigning admissible regions such that they are nested in order of priorities, wherein the largest of the admissible regions corresponds to the highest priority class.

In addition to using a priority of an information flow in determining the admissible region useable for transmitting the information flow, an overall load on the network, to which an admission of the information flow is requested, may also be taken into considerations in the determination. In using the overall load on the network in determining the admission request for the information flow, a conditional admissible region useable for transmitting the information flow may be first determined based on the priority of the information flow and by assuming the overall load on the network to be within a reference load range among a plurality of increasingly higher ranges of the overall network load.

After determining the conditional admissible region useable for transmitting the information flow by assuming the overall network load to be within the reference load range as discussed above, a size of the conditional admissible region useable for transmitting the information flow may be successively increased or decreased with each successive increase or decrease of the range of an overall network load among the plurality of increasingly higher ranges of the overall network load relative to the reference load range.

An overall load on a network may be any reasonably-suitable overall load on the network that may be competitively distributed among different stations of the network, such as an access to a central processing unit in the network, an access to wireless access points, etc. The overall network load may be measured by any reasonably-suitable method of measuring a network load, such as a detection of a channel-busy period, average collision ratio, etc. The overall network load used in the determination of the admissible region within the channel data rate range may be a current overall load on the network. Alternatively, any reasonably-suitable past and/or projected overall load on the network may be used with or in place of the current overall load on the network.

As to the above-described sequence of firstly determining a cumulative distribution function of a channel data rate of a communication channel, secondly determining a conditional admissible region within a channel data rate range of the communication channel, which is useable for transmitting an information flow, and thirdly determining an admissible region within the channel data rate range, which is useable for transmitting the information flow, it should be apparent to those of ordinary skill in the art that other steps may be added or existing steps may be removed, modified or rearranged without departing from a scope of a priority-based admission control according to an example.

Figure 1:
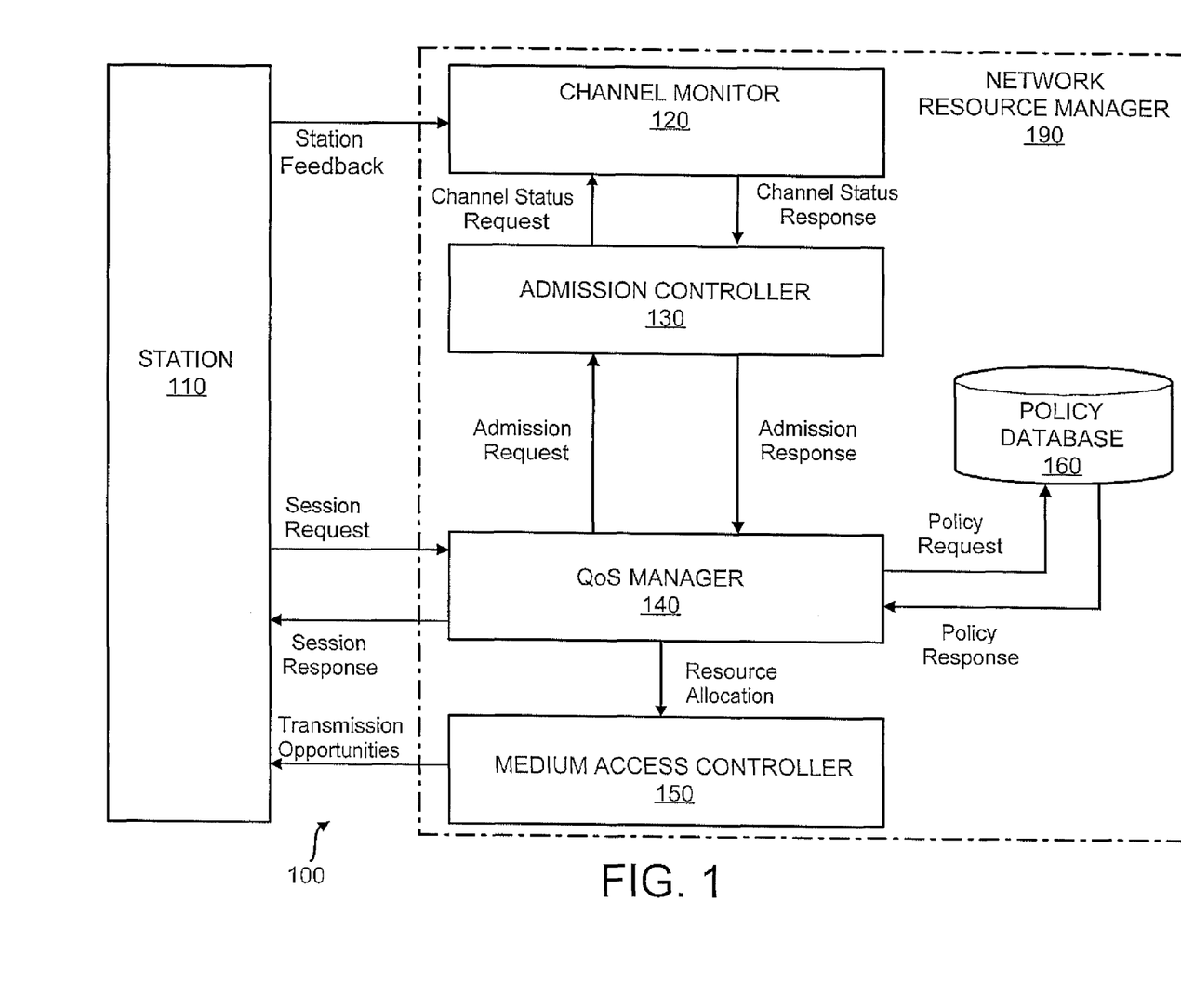
FIG. 1 illustrates a network resource manager in a priority-based admission control system according to an exemplary embodiment of the invention.

Turning now to FIG. 1, shown therein is a network resource manager within a priority-based admission control system 100 according to an example. In describing operations of the priority-based admission control system 100 briefly, a station 110 connected to a network that is managed by a network resource manager 190 generates a session request to request an admission of an information flow to the network. An admission controller 130 determines whether to grant the admission request based on a priority of the information flow and an overall load on the network. It should be understood that the system 100 may include additional components and that some of the components described herein may be removed and/or modified without departing from a scope of the system 100.

Messages exchanged amongst different components of the network resource manager 190 and the station 110 are given in a table below.

| Control Message | Message Content |
|---|---|
| Station Feedback | Station ID, current channel data rate |
| Session Request | Station ID, user ID, interface ID, QoS requirements |
| Session Response | Station ID, session request determination. Additional information if session request is accepted: flow ID, traffic parameters for QoS provisioning |
| Channel Status Request | Station ID |
| Channel Status Response | Station ID, current channel data rate, cumulative distribution function of channel data rate |
| Policy Request | Station ID, flow ID, QoS requirements |
| Policy Response | User priority, traffic priority |
| Admission Request | Station ID, flow ID, user priority, QoS requirements |
| Admission Response | Station ID, flow ID, admission decision |
| Resource Allocation | Station ID, flow ID, traffic priority, QoS requirements |
| Transmission Opportunities | Station ID, flow ID, transmission opportunities |

In describing the priority-based admission control system 100 in more detail, the station 110 is connected to a network, which may comprise one or more other stations 110. The station 110 makes an admission request for transmitting an information flow to the network through a communication channel by communicating a session request message to a quality of service (QoS) manager 140. The session request message comprises an identification (ID) of the station 110, an identification of a user associated with the information flow, an identification of an interface, and QoS requirements for the information flow. The station 110 receives a session response message from the QoS manager 140, which comprises an identification of the station 110 and a determination on the session request. If the session request determination indicates that the session request is accepted, the session response message may additionally include an identification of the information flow and traffic parameters for QoS provisioning.

The session response message received by the station 110 from the QoS manager 140 indicates whether the session request has been accepted, which depends on whether the admission request for the information flow has been granted by the priority-based admission control system 100.

The station 110 receives a transmission opportunities message for the information flow from a medium access controller 150 if a resource allocation message is communicated from the QoS manager 140 to the medium access controller 150, indicating that the admission request for admission for the information flow has been granted. The transmission opportunities message from the medium access controller 150 comprises information as to transmission opportunities for the station 110 in transmitting the information flow on the communication channel. The transmission opportunities message from the medium access controller 150 further comprises an identification of the station 110 and an identification of the information flow.

Further, the station 110 communicates a station feedback message to a channel monitor 120, which message comprises a current channel data rate of the communication channel. The station feedback message further comprises an identification of the station 110.

The channel monitor 120 receives the station feedback message from the station 110. The channel monitor 120 also receives a channel status request message from the admission controller 130, which message comprises an identification of the station 110. In response to the channel status request message from the admission controller 130, the channel monitor 120 communicates a channel status response message to the admission controller 130, which message comprises the current channel data rate of the communication channel. The channel status response message also comprises an identification of the station and a cumulative distribution function of a channel data rate of the communication channel.

The admission controller 130 receives an admission request message from the QoS manager 140, which message comprises an identification of the station 110, an identification of the information flow to be transmitted on the communication channel by the station 110, a priority of a user associated with the information flow, and other QoS requirements for the information flow. The priority of a user and/or other QoS requirements may be used by the admission controller 130 to determine a priority for the information flow. Further, the admission controller 130 receives a channel status response message from the channel monitor 120 and communicates an admission response message to the QoS manager. The admission response message comprises an identification of the station 110, an identification of the information flow, and a determination on the admission request.

In determining whether to grant the admission request for the information flow and communicating the determination to the QoS manager, the admission controller 130 determines an admissible region within a channel data rate range of the communication channel, which is useable for transmitting the information flow, based on the priority of the information flow as described above. In determining the admissible region based on the priority of the information flow, the admission controller 130 may use the cumulative distribution function of the channel data rate of the communication channel.

Further, the admission controller 130 may use the priority of the information flow to determine a conditional admissible region within the channel data rate range of the communication channel and determine the admissible region useable for transmitting the information flow based on an overall load on the network. For instance, as described above, the conditional admissible region for the information flow, as determined based on the priority of the information flow, may be successively increased or decreased with each successive increase or decrease of a range of the overall network load among a plurality of increasingly higher ranges of the overall network load relative to a reference load range. The admission controller 130 may determine overall network load based resources committed to existing information flows. Resources committed to information flows may, for example, be represented by time fractions allocated to transmitting the information flows.

After determining the admissible region for transmitting the information flow, a further determination is made as to whether a transmission time for transmitting the information flow at a current channel data rate of the communication channel is within a maximum time slot allowed to the station 110. If the time is within the maximum time slot allowed to the station 110, an admission response message from the admission controller 130 indicates a grant of the admission request for the information flow. Otherwise, the admission response message from the admission controller 130 indicates a rejection of the admission request for the information flow.

The admission controller 130 may be a single unitary device or multiple devices and any one or all of features of the admission controller 130 may be distributed to the station and other components 120, and 140-160 of the network resource manager 190. The admission controller 130 may be any reasonably suitable device that grants an admission request for transmitting an information flow to a network through a communication channel based on a priority of the information flow. The admission determination may additionally take into considerations an overall load of the network.

Exemplary features of the admission controller 130 in addition to the above-described exemplary features will be explained in detail in reference to priority-based admission control methods shown in FIGS. 4-5.

While a current channel data rate of the communication channel has been referred to in describing the operations of the station 110, channel monitor 120, and admission controller 130, any reasonably-suitable past or projected channel data rate may be used alternatively to or in conjunction with the current channel data rate of the communication channel. Similarly, with respect to the overall network load used by the admission controller 130 in determining the admissible region within the channel data rate range, any reasonably-suitable past, current, or projected overall load of the network, to which the admission of the information flow is requested, may be used alternatively or in any combination.

The QoS manager 140 receives a session request message from the station 110 and communicates a session response message to the station, as described above. In response to receiving the session request message from the station 110, the QoS manager 140 generates and communicates a policy request message to a policy database 160, which message comprises an identification of the station 110, an identification of the information flow, and QoS requirements for the information flow.

After the communication of the policy request message to the policy database 160, the QoS manager 140 receives a policy response message from the policy database 160, which message comprises information as to a priority of a user associated with the information flow and a traffic priority of the information flow. A priority of the user associated with the information flow may be used to set a priority of the information flow. A traffic priority may represent a priority for resource allocation to an admitted information flow among different types of traffic, such as voice, video, etc., and is used, for example, to determine an allocation of buffering and transmission resources for transmitting the information flow.

When the QoS manager 140 receives an admission response message from the admission controller 130 that indicates a grant of the admission request for the information flow, the QoS manager 140 generates a resource allocation message. The resource allocation message comprises the identification of the station 110, an identification of the information flow, a traffic priority of the information flow, and other QoS requirements for the information flow.

The medium access controller 150 receives a resource allocation message from the QoS manager 140 and communicates a transmission opportunities message to the station 110, as described above.

The policy database 160 receives a policy request message from and communicates a policy response message to the QoS manager 140 as described above. The policy database 160 may be any reasonably suitable database comprising any policy information associated with information flow, such as priorities of users associated with information flow and traffic priorities of information flow, etc.

Figure 2:
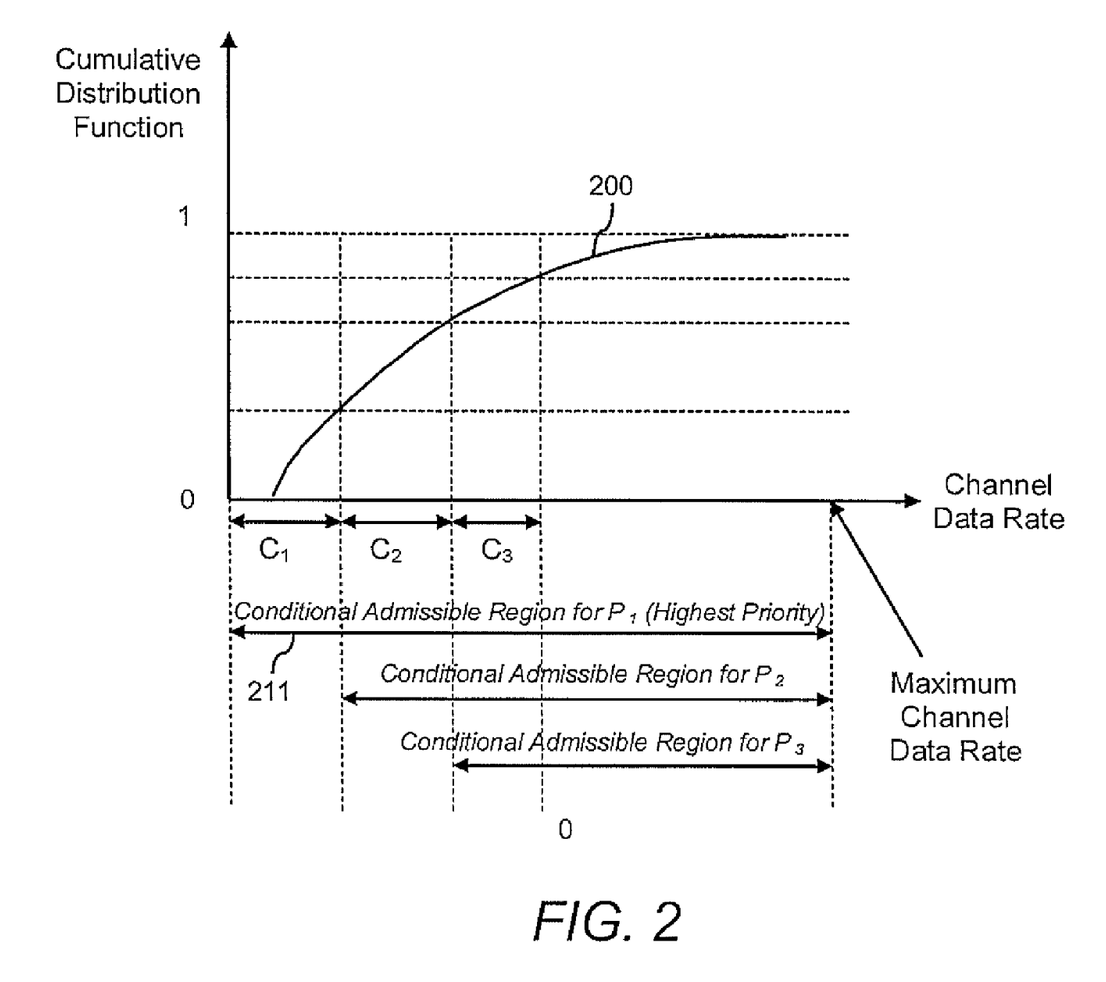
FIG. 2 illustrates an assignment of conditional admissible regions within a channel data rate range of a communication channel to different classes of information flow, respectively, based on a cumulative distribution function of a channel data rate of the communication channel according to an exemplary embodiment of the invention.

Turning now to FIG. 2, shown therein is an assignment of conditional admissible regions within a channel data rate range of a communication channel to different priorities of information flow, respectively, based on a cumulative distribution function 200 of the channel data rate of the communication channel according to an example. The cumulative distribution function 200 starts from a value of zero and continues to increase as the channel data rate of the communication channel increases until the cumulative distribution function reaches a value of one when the channel data rate reaches a maximum channel data rate.

In assigning different conditional admissible regions of the channel data rate range to different priorities of information flow, respectively, the channel data rate range is firstly divided into a plurality of non-overlapping regions $C_1$-$C_M$ of the channel data rate range. Secondly, different groups of the non-overlapping regions $C_1$-$C_M$ correspond to different priorities of information flow, $P_1$-$P_M$, respectively, as the conditional admissible regions useable for transmitting information flow with the respective priorities. $P_1$ is the highest priority class and $P_M$ is the lowest priority class. As shown with the conditional admissible region 211 useable for transmitting information flow with the highest priority class $P_1$ in FIG. 2, the conditional admissible region useable for transmitting an information flow with the highest priority class may extend across the entire channel data rate range of the communication channel and have the largest width among a plurality of conditional admissible regions assigned to different priorities of information flow, respectively.

Each successively lower priority class of information flow, $P_2$-$P_M$, with respect to the highest priority class of information flow, $P_1$, has a conditional admissible region, which upper boundary ends the maximum channel data rate of the communication channel but lower boundary starts at a successively higher channel data rate respect to that of the conditional admissible region 211 for the highest priority class $P_1$ as shown in FIG. 2. Thus each successively lower priority class of information flow, $P_2$-$P_M$, with respect to the highest priority class of information flow, $P_1$, occupies a successively smaller conditional admissible region with respect to the conditional admissible region 211 useable for transmitting information flow with the highest priority class $P_1$, as shown in FIG. 2.

Any other reasonably-suitable method of determining conditional admissible regions based on priorities of information flow may also be used. Each such method may give an information flow with a relatively higher priority class a higher probability of being admitted to the network compared to an information flow with a relatively lower priority class.

The conditional admissible regions determined as described above may be adopted as admissible regions within the channel data rate range, which are useable for transmitting information flows with different priorities, without any changes or may be rearranged, adjusted, and/or changed based on other factors, such as an overall load on the network, to which the information flow is requested to be admitted.

Figure 3:
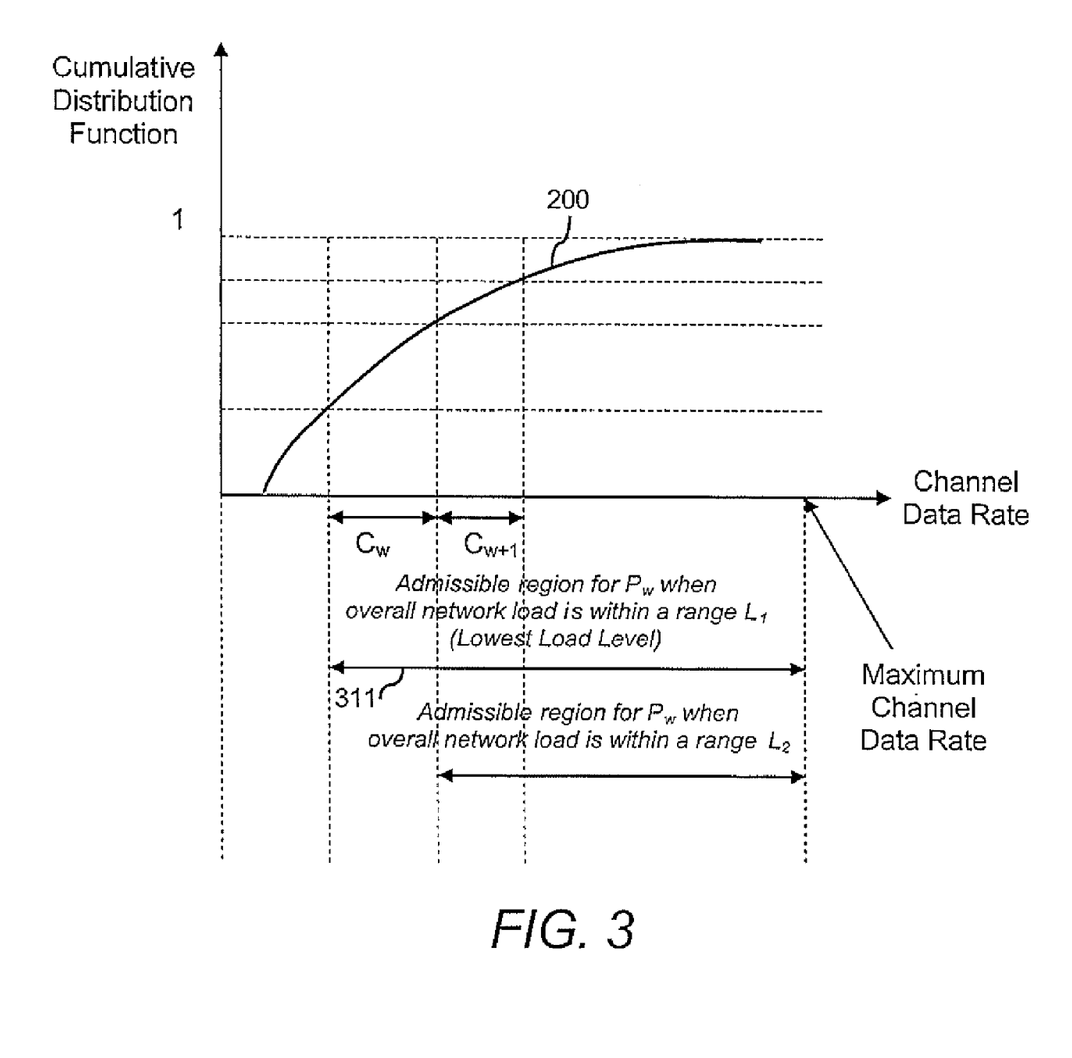
FIG. 3 illustrates an assignment of an admissible region within a channel data rate range of a communication channel, which is useable for transmitting information flow with a particular priority class, based on an overall load on a network and a cumulative distribution function of a channel data rate of the communication channel according to an exemplary embodiment of the invention.

FIG. 3 illustrates an assignment of an admissible region within a channel data rate range of a communication channel, which is useable for transmitting an information flow with a priority $P_w$, based on an overall load on a network, and a cumulative distribution function 200 of a channel data rate of a communication channel for transmitting the information flow according to an example. Firstly, a conditional admissible region 311 useable for transmitting the information flow with a priority $P_w$, which is a collection of non-overlapping regions $C_w$-$C_{w+i}$ within the channel data rate range, is determined as described above in reference to FIG. 2 by assuming that an overall load on the network is in a reference load range among a plurality of increasingly higher ranges of the overall load on the network. In the example of FIG. 3, the lowest overall network load range $L_1$ among a plurality of increasingly higher ranges of an overall load on the network, $L_1$-$L_k$, is the reference load range.

Secondly, an actual overall load on the network is determined. If the actual overall network load is in the lowest load range $L_1$, the conditional admissible region useable for transmitting an information flow with the priority $P_w$ is assigned as the admissible region for transmitting information flow with the priority $P_w$.

Otherwise, as a range of the overall network load successively increases within the plurality of increasingly higher ranges of the overall network load relative to the lowest overall network load range $L_1$, the lowest one of remaining non-overlapping regions $C_w$-$C_{w+i}$ of the conditional admissible region are successively removed in determining the admissible region for transmitting an information flow with the priority $P_w$. Thus, as a range of the overall network load successively increases among the plurality of increasingly higher ranges of the overall network load relative to the lowest overall network load range $L_1$, the admissible region is successively reduced relative to the conditional admissible region determined for the information flow with the priority $P_w$.

Figure 4:
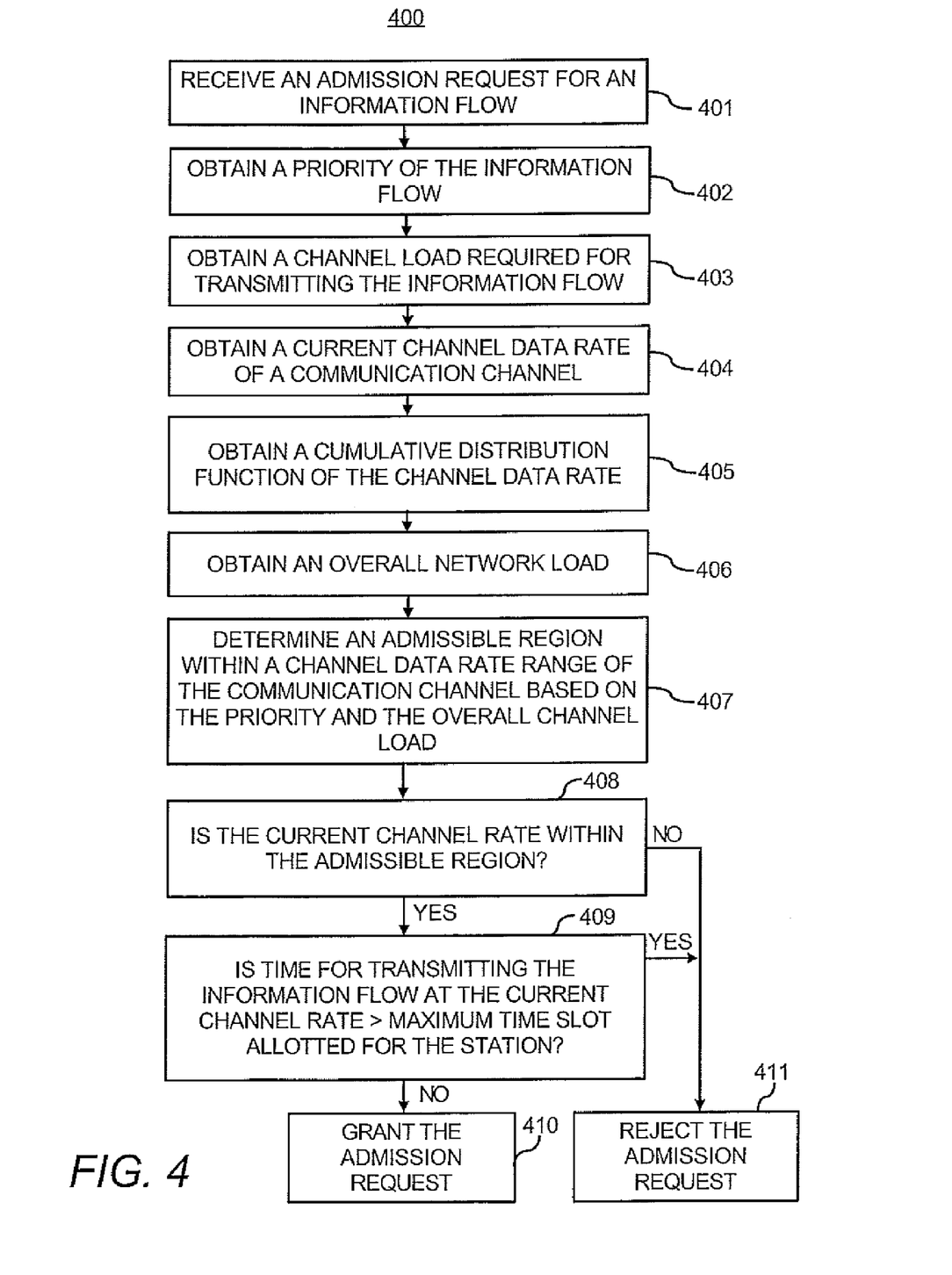
FIG. 4 illustrates a flow-chart of a method for a priority-based admission control according to an exemplary embodiment of the invention.

FIG. 4 illustrates a flow-chart of a method 400 for a priority-based admission control according to an example. It should be apparent to those of ordinary skill in the art that other steps may be added or existing steps may be removed, modified or rearranged without departing from a scope of the method 400.

At step 401, an admission request for an information flow is received by the network from a station, for instance, through the session request from the station 110 to the QoS manager 140.

At step 402, a priority of the information flow is obtained, for instance, by the admission controller 130 based on a priority of a user associated with the information flow and/or other QoS requirements from the policy database 160.

At step 403, a load placed on a communication channel for transmitting the information flow is obtained, for instance, by the admission controller 130, based on QoS requirements for the information flow.

At step 404, a current channel data rate of a communication channel for transmitting the information flow is obtained, for instance, from the station 110 through the station feedback message conveyed to the channel monitor 120, which in turn relays the current channel data rate of the communication channel to the admission controller 130 through the channel status response message.

At step 405, a cumulative distribution function of a channel data rate of the communication channel is obtained, for instance, by the admission controller 130 from the channel monitor 120 through the channel status response.

At step 406, an overall load on a network connected to the station is obtained, for instance, by the admission controller 130, based on, for instance, time fractions allocated to transmitting information flows.

At step 407, an admissible region within a channel data rate range of the communication channel, which is useable for transmitting the information flow, is determined based on the priority of information flow and the overall network load.

At step 408, a determination is made as to whether the current channel data rate of the communication channel is within the admissible region of the channel data rate range.

If the current channel data rate is not within the admissible region of the channel data rate range, the admission request for the information flow is rejected at step 411.

If the current channel data rate is within the admissible region of the channel data rate range, a further determination is made at step 409 as to whether a transmission time for transmitting the information flow at the current channel data rate of the communication channel is greater than a maximum time slot allowed for the station. The transmission time may be determined, for instance, by dividing the load placed on the communication channel for transmitting of the information flow by the current channel data rate.

If the transmission time is greater than the maximum time slot allowed for the station, the admission request for the information flow is rejected at step 411.

If the transmission time is not greater than the maximum time slot allowed for the station, the request for the admission of the information flow is granted at step 410.

When the admission request for the information flow is rejected at step 411, after a predetermined period of time, if the station 110 still desires to transmit the information flow to the network, at least one additional admission request may be made by the station 110 to start the admission determination process of FIG. 4 all over again.

Figure 5:
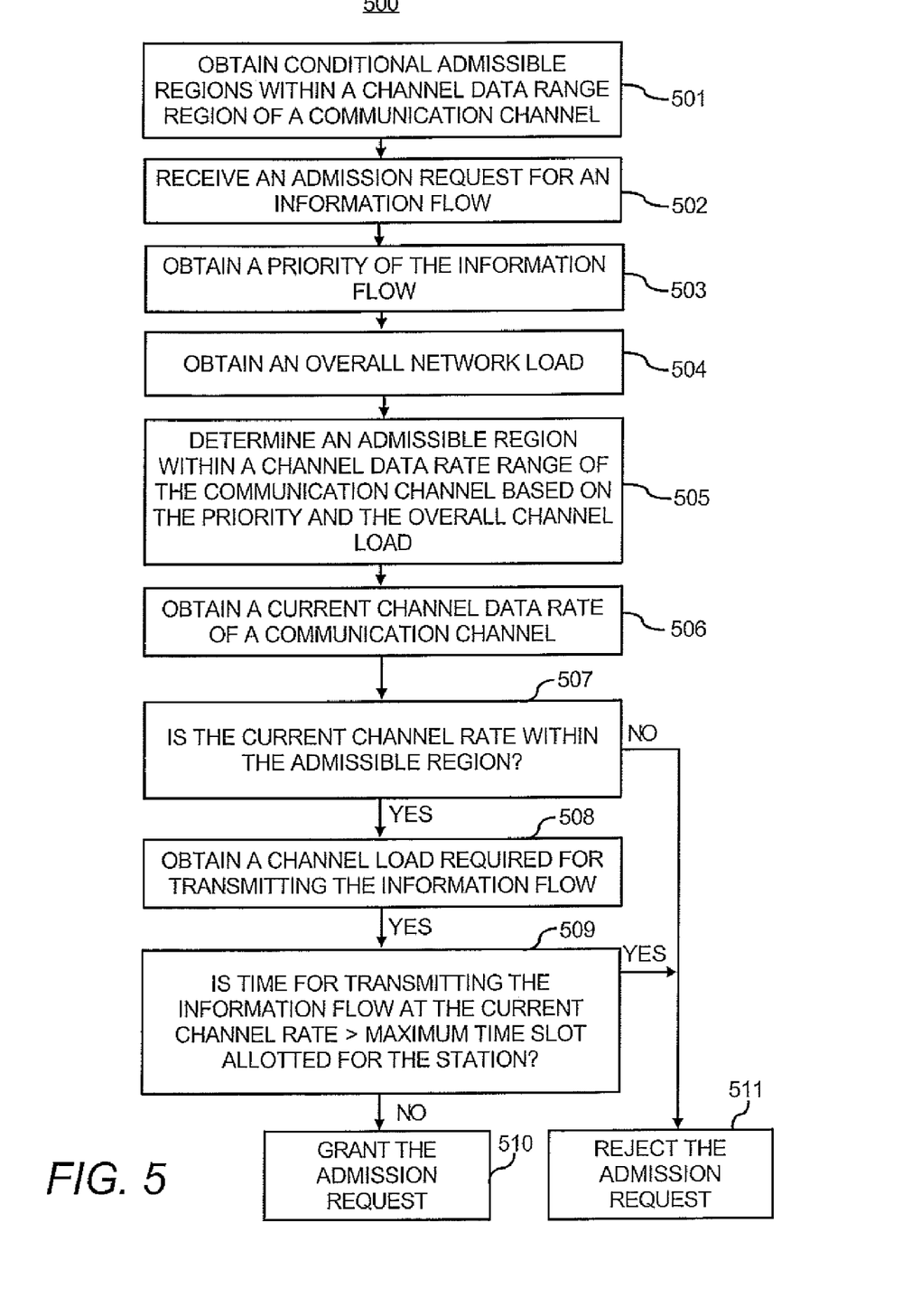
FIG. 5 illustrates a flow-chart of a method for a priority-based admission control according to another exemplary embodiment of the invention.

Turning now to FIG. 5, illustrated therein is a flow-chart of a method 500 for a priority-based admission control according to another example. It should be apparent to those of ordinary skill in the art that other steps may be added or existing steps may be removed, modified or rearranged without departing from a scope of the method 500.

At step 501, conditional admissible regions within a channel data rate range of the communication channel, which are useable for transmitting different priorities of information flow, are determined, for instance, by the admission controller 130 based on a cumulative distribution function of a channel data rate of the communication channel.

At step 502, an admission request for an information flow is received, for instance, through the session request from the station 110 to the QoS manager 140.

At step 503, a priority of the information flow is obtained, for instance, from the policy database 160.

At step 504, an overall load on a network connected to the station is obtained, for instance, by the admission controller 130, based on, for instance, time fractions allocated to transmitting information flows.

At step 505, an admissible region within the channel data rate range, which is useable for transmitting the information flow, is determined based on the priority of the information flow and the overall network load.

At step 506, a current channel data rate of the communication channel is obtained, for instance, by the admission controller 130.

At step 507, a determination is made as to whether the current channel data rate of the communication channel is within the admissible region of the channel data rate range.

If the current channel data rate is not within the admissible region, the admission request for the information flow is rejected at step 511.

If the current channel data rate is within the admissible region, a load placed on the communication channel for transmitting the information flow is obtained at step 508, for instance, by the admission controller 130, based on QoS requirements for the information flow.

At step 509, a determination is made as to whether a transmission time for transmitting the information flow at the current channel data rate of the communication channel is greater than a maximum time slot allowed for the station.

If the transmission time is greater than the maximum time slot allowed for the station, the admission request for the information flow is rejected at step 511.

If the transmission time is not greater than the maximum time slot allowed for the station, the request for the admission of the information flow is granted at step 510.

When the admission request for the information flow is rejected at step 511, after a predetermined period of time, if the station 110 still desires to transmit the information flow to the network, at least one additional admission request may be made by the station 110 to start the admission determination process of FIG. 5 all over again.

The above described operations of a priority-based admission control in reference to exemplary features and embodiments of FIGS. 1-5 may be contained as a computer program product embodied on one or more computer readable mediums. The computer program product may exist in a variety of forms both active and inactive. For example, the computer program product may exist as software program(s) comprised of program instructions in source code, object code, executable code or other formats whether compressed or uncompressed.

Exemplary computer readable mediums include conventional computer system RAM, ROM, EPROM, EEPROM, and magnetic or optical disks or tapes. Concrete examples of the foregoing include distribution of the programs on a CD ROM or via Internet download. In a sense, the Internet itself, as an abstract entity, is a computer readable medium. The same is true of computer networks in general.

A priority-based admission control according to above-described exemplary features and embodiments of FIGS. 1-5 grants a request for an admission to a network for an information flow by first determining an admissible region within a channel data rate range of communication channel, which is useable for transmitting the information flow, based on a priority of the information flow. If a channel data rate of the communication channel is within the determined admissible region and a transmission time for transmitting the information flow on the communication channel is within a maximum time slot allowed to the station, the admission request is granted. In determining the admissible region for the information flow, an overall load on a network may be considered.

A priority-based admission control according to exemplary features and embodiments of FIGS. 1-5 may be applied in any suitable communication network where a channel data rate of a communication channel of a station varies, such as a wireless channel or wired channel with varying channel conditions in a small or large network. One example of such a network is a small home network, where stations may be connected to a backbone network of a home network via a wireless channel and may vary their transmission rates to adapt to mobility and a dynamic propagation environment.

Another example of a network having a station with varying transmission rates is a wireless mesh network, where different networks may have different transmission rates. In any such network with varying transmission rates of stations on the network, a priority-based admission control according to exemplary features and embodiments of FIGS. 1-5 may be used to improve an admission control in the network.

While exemplary features and embodiments of FIGS. 1-5 have been explained within the context of each feature and embodiment, any one or all of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A method for priority-based admission control in a network, the method comprising:

receiving an admission request for transmitting an information flow to a network through a communication channel having a channel data rate range;

obtaining a priority of the information flow, wherein the priority of the information flow is one of a plurality of priorities of information flow;

dividing up the channel data rate range into a plurality of non-overlapping regions;

determining an admissible region within a range of a channel data rate of the communication channel in response to the priority of the information flow, wherein the admissible region is one of a plurality of admissible regions within the channel data rate range that correspond to different ones of the plurality of priorities of information flow, respectively, and each of the plurality of admissible regions is useable for transmitting information flow with a respective one of the plurality of priorities;

determining an available channel data rate of the communication channel for receiving the information flow by the network; and granting the admission request for the information flow after determining that the available channel data rate of the communication channel is within the admissible region of the channel data rate range, wherein determining an admissible region within the channel data rate range comprises selecting a group of the non-overlapping regions as the admissible region.

2. The method of claim 1, further comprising obtaining an overall load on the network, wherein determining an admissible region within the channel data rate range includes determining the admissible region in response to the overall network load.

3. The method of claim 2, wherein determining the admissible region within the channel data rate range in response to the overall network load comprises:

determining a conditional admissible region within the channel data rate range in response to the priority of the information flow, wherein the conditional admissible region is one of a plurality of conditional admissible regions within the channel data rate range that correspond to different ones of the plurality of priorities of information flow, respectively, by assuming that the overall network load is in a reference load range among a plurality of increasingly higher ranges of the overall network load, each of the plurality of conditional admissible regions being useable for transmitting information flow with a respective one of the plurality of priorities; and determining the admissible region within the channel data rate range by successively increasing or decreasing a size of the conditional admissible region with each successive increase or decrease of a range of the overall network load among the plurality of increasingly higher ranges of the overall network load relative to the reference load range.

4. The method of claim 1, wherein one of the plurality of non-overlapping regions corresponding to the lowest channel data rate within the channel data rate range and assignable for transmitting information flow is dedicated for transmitting information flow with the highest priority class among the plurality of priorities of information flow.

5. The method of claim 1, further comprising rejecting the admission request after determining that a transmission time for transmitting the information flow at the channel data rate of the communication channel is greater than a maximum time slot allowed for a station having the communication channel.

6. The method of claim 1, further comprising obtaining a cumulative distribution function of a channel data rate of the communication channel, wherein determining an admissible region within the channel data rate range comprises using the cumulative distribution function in assigning the plurality of admissible regions within the channel data rate range to different ones of the plurality of priorities of information flow, respectively.

7. A system for priority-based admission control in a network, the system comprising:

an admission controller configured to receive an admission request for transmitting an information flow to a network through a communication channel having a channel data rate range, divide up the channel data rate range into a plurality of non-overlapping regions, determine an admissible region within a range of a channel data rate of the communication channel based on a priority of the information flow among a plurality of priorities of information flow, and grant the admission request for the information flow based on a determination that an available channel data rate of the communication channel for receiving the information flow by the network is within the admissible region of the channel data rate range, wherein the admissible region is one of a plurality of admissible regions within the channel data rate range that correspond to different ones of the plurality of priorities of information flow, respectively, and each of the plurality of admissible regions within the channel data rate range is useable for transmitting information flow with a respective one of the plurality of priorities; and a policy database configured to communicate to the admission controller information as to a priority of a user associated with the information flow, wherein the admission controller is configured to use the information to determine the priority of the information flow, wherein the admission controller determines an admissible region within the channel data rate range comprises selecting a group of the non-overlapping regions as the admissible region.

8. The system of claim 7, wherein the admission controller is further configured to determine the admissible region within the channel data rate range based on an overall load on the network.

9. The system of claim 7, wherein the assignment of the plurality of admissible regions within the channel data rate range to different ones of the plurality of priorities of information flow, respectively, is based on a cumulative distribution function of a channel data rate of the communication channel.

10. A tangible non-transitory computer readable medium containing a program product for priority-based admission control, the computer program product comprising instructions to:

receive an admission request for transmitting an information flow to a network through a communication channel having a channel data rate range;

obtain a priority of the information flow, wherein the priority of the information flow is one of a plurality of priorities of information flow;

divide up the channel data rate range into a plurality of non-overlapping regions;

determine an admissible region within a range of a channel data rate of the communication channel in response to the priority of the information flow, wherein the admissible region is one of a plurality of admissible regions within the channel data rate range that correspond to different ones of the plurality of priorities of information flow, respectively, and each of the plurality of admissible regions within the channel data rate range is useable for transmitting information flow with a respective one of the plurality of priorities;

determine an available channel data rate of the communication channel for receiving the information flow by the network; and grant the admission request for the information flow after determining that the available channel data rate of the communication channel is within the admissible region of the channel data rate range, wherein the instruction to determine an admissible region within the channel data rate range comprises selecting a group of the non-overlapping regions as the admissible region.

11. The computer readable medium of claim 10, further comprising instruction to:

obtain an overall load on the network, wherein determining an admissible region within the channel data rate range includes determining the admissible region in response to the overall network load.

12. The computer readable medium of claim 11, wherein determining the admissible region within the channel data rate range in response to the overall network load comprises:

determining a conditional admissible region within the channel data rate range in response to the priority of the information flow, wherein the conditional admissible region is one of a plurality of conditional admissible regions within the channel data rate range that correspond to different ones of the plurality of priorities of information flow, respectively, by assuming that the overall network load is in a reference load range among a plurality of increasingly higher ranges of the overall network load, each of the plurality of conditional admissible regions being useable for transmitting information flow with a respective one of the plurality of priorities; and determining the admissible region for the information flow by successively increasing or decreasing a size of the conditional admissible region with each successive increase or decrease of a range of the overall network load among the plurality of increasingly higher ranges of the overall network load relative to the reference load range.

13. The computer readable medium of claim 12, wherein one of the plurality of non-overlapping regions corresponding to the lowest channel data rate within the channel data rate range and assignable for transmitting information flow is dedicated for transmitting information flow with the highest priority class among the plurality of priorities of information flow.

* * * * *